(12) United States Patent
Xie (10) Patent No.: US 8,986,797 B2
(45) Date of Patent: Mar. 24, 2015

(54) FAN CASE CONTAINMENT SYSTEM AND METHOD OF FABRICATION

(75) Inventor: Ming Xie, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 13/196,502

(22) Filed: Aug. 2, 2011

(65) Prior Publication Data

US 2012/0034076 A1 Feb. 9, 2012

Related U.S. Application Data

(60) Provisional application No. 61/370,540, filed on Aug. 4, 2010.

(51) Int. Cl.
| | |
|---|---|
| *F01B 25/16* | (2006.01) |
| *F01D 21/04* | (2006.01) |
| *B29C 70/32* | (2006.01) |
| *B29D 99/00* | (2010.01) |
| *B29L 31/00* | (2006.01) |

(52) U.S. Cl.
CPC .............. *F01D 21/045* (2013.01); *B29C 70/32* (2013.01); *B29D 99/0014* (2013.01); *Y02T 50/672* (2013.01); *B29L 2031/7504* (2013.01)
USPC .............. 428/34.1; 428/116; 415/9; 415/119; 415/196; 415/197

(58) Field of Classification Search
USPC ............. 428/34.7, 35.3; 244/119; 415/119, 9, 415/196
See application file for complete search history.

(56) References Cited

U.S. PATENT DOCUMENTS

| | | | |
|---|---|---|---|
| 4,012,549 A | 3/1977 | Slysh | |
| 4,086,378 A | 4/1978 | Kam et al. | |
| 4,137,354 A | 1/1979 | Mayes, Jr. et al. | |
| 5,431,532 A | 7/1995 | Humke et al. | |
| 6,053,696 A | 4/2000 | Roberts | |
| 6,098,926 A * | 8/2000 | Morgenthaler | 244/119 |
| 6,179,551 B1 | 1/2001 | Sathianathan et al. | |
| 6,652,222 B1 | 11/2003 | Wojtyczka et al. | |
| 6,740,381 B2 | 5/2004 | Day et al. | |
| 6,814,541 B2 | 11/2004 | Evans et al. | |
| 7,479,201 B1 | 1/2009 | Wegner et al. | |
| 7,625,185 B2 | 12/2009 | Wobben | |
| 2008/0023127 A1 * | 1/2008 | Misciagna et al. | 156/169 |

(Continued)

FOREIGN PATENT DOCUMENTS

| | | |
|---|---|---|
| CN | 1829596 A | 9/2006 |
| CN | 101646548 A | 2/2010 |

(Continued)

OTHER PUBLICATIONS

PCT Search Report and Written Opinion issued Oct. 19, 2011 in corresponding Application No. PCT/US2011/046430.

(Continued)

*Primary Examiner* — Ellen S Wood (74) *Attorney, Agent, or Firm* — General Electric Company; William Scott Andes (57) ABSTRACT

Composite article includes a generally cylindrical body having an internal grid structure interleaved with casing layers formed of reinforcing fibers disposed in a resin matrix. The composite article may be utilized in a fan case containment system for aircraft engine applications. Methods for fabricating the composite article are also provided.

16 Claims, 5 Drawing Sheets

(56) References Cited

U.S. PATENT DOCUMENTS

| | | |
|---|---|---|
| 2008/0128073 A1 | 6/2008 | Xie et al. |
| 2008/0145215 A1 | 6/2008 | Finn et al. |
| 2008/0253883 A1 | 10/2008 | Pool et al. |
| 2009/0098337 A1 | 4/2009 | Xie et al. |
| 2009/0169833 A1 | 7/2009 | Koon et al. |

FOREIGN PATENT DOCUMENTS

| | | |
|---|---|---|
| EP | 2070689 A2 | 6/2009 |
| WO | 9961757 A1 | 12/1999 |
| WO | 0013169 A2 | 3/2000 |

OTHER PUBLICATIONS

Unofficial English translation of Office Action issued in connection with corresponding CN Application No. 201180048105.9 on Jun. 30, 2014.

* cited by examiner

FAN CASE CONTAINMENT SYSTEM AND METHOD OF FABRICATION

BACKGROUND OF THE INVENTION

This invention relates generally to fan case containment systems and methods of fabrication, and more specifically to fiber reinforced composite fan case containment systems.

Gas turbine engines, and particularly turbofan engines used in aircraft, have a fan with a hub and a plurality of fan blades disposed for rotation about a central axis. Catastrophic damage can occur to the aircraft and its occupants if a broken fan blade is propelled radially outwardly from the rotating hub under centrifugal force and impacts on the aircraft fuselage.

To prevent such damage, it is common to include a generally cylindrical fan case about the periphery for containing the fan blade. For smaller diameter engines, adequate containment capability may be achieved with a metallic, hard-wall, case thick enough to resist penetration by blade fragments. However, for larger diameter engines, a metallic case thick enough to resist penetration is prohibitively heavy. Therefore, it is known in the art to utilize what are termed "soft-wall" containment systems.

In a soft-wall system, a lightweight, high strength ballistic fabric may be wrapped in multiple layers around a relatively thin support structure. In operation, a separated blade or blade fragment locally penetrates the support structure and strikes the fabric. The fabric layers capture and contain the fragment. Conventional support structures may be fabricated of aluminum based on weight considerations. The support structure may include aluminum honeycomb structures.

U.S. Pat. No. 6,053,696 proposes a composite shell for a gas turbine engine fan case. The composite shell disclosed therein includes two end support hoops structurally bonded to a center portion having an open lattice structure. Other examples of fiber reinforced composite structures and fabrication methods are provided in the following U.S. patents: U.S. Pat. No. 4,086,378 to Kam et al shows a cylindrical composite structure with helical, axial and circumferential reinforcing ribs forming an interior lattice; U.S. Pat. No. 4,012,549 to Slysh describes a high strength composite structure with an isogrid lattice of equilateral triangles; and U.S. Pat. No. 4,137,354 to Mayes, Jr. et al describes a ribbed composite cylindrical structure and manufacturing process.

In composite softwall fan containment case design, structural integrity during and after a fan blade out (FBO) event is a critical design requirement. Aluminum honeycomb used in a more conventional softwall containment case design might not provide sufficient residual stiffness and strength. Also, bonding net shape aluminum honeycomb to composite inner shell is a costly manufacturing process.

Softwall fan containment case design is usually lighter weight than a hardwall containment case design. However, hardwall case is usually less costly to fabricate since the complete casing structure can be fabricated in one single process without the additional cost associated with containment fabric.

Accordingly, it would be desirable to have a containment system incorporating advantages of a lighter weight softwall containment case while providing simplified fabrication processes.

BRIEF DESCRIPTION OF THE INVENTION

Exemplary embodiments disclosed herein provide a fan case containment system including a cylindrical fan case composite structure. Other exemplary embodiments disclosed herein are directed to fabrication methods for forming a cylindrical fan case for use in a containment system.

Exemplary embodiments disclosed herein include a composite article comprising: a substantially cylindrical body including a plurality of casing sublayers comprising reinforcing material disposed in a resin matrix. The body includes at least one intermediate casing sublayer radially disposed between an innermost casing sublayer and an outermost casing sublayer. The composite article also includes an internal grid disposed within the body which defines a plurality of grid spaces. At least one intermediate casing sublayer extends in the plurality of grid spaces.

Exemplary embodiments disclosed herein include a substantially cylindrical composite article comprising reinforcing fiber windings. A first portion of the fiber windings are laid out in a predetermined internal grid pattern to form an internal grid structure defining a plurality of grid spaces. A second portion of the fiber windings are laid out in a predetermined body sublayer pattern to form a plurality of sublayers of a body, wherein the sublayers of the body extend in the grid spaces.

Exemplary embodiments disclosed herein include a method of forming a composite article. The method includes disposing successive fiber windings onto a substantially cylindrical mandrel. A first portion of the fiber windings are laid on in a predetermined internal grid pattern to form an internal grid structure which defines a plurality of grid spaces. A second portion of the fiber windings are laid on in a predetermined body sublayer pattern to form an innermost casing sublayer an outermost casing sublayer and at least one intermediate casing sublayer radially disposed between an innermost sublayer and an outermost sublayer. The intermediate casing sublayer extends in the plurality of grid spaces. In an exemplary embodiment, the fiber windings comprise reinforcing material disposed in a curable resin matrix.

BRIEF DESCRIPTION OF THE DRAWINGS

Exemplary embodiments of the invention may be best understood by reference to the following description taken in conjunction with the accompanying drawing figures in which.

DETAILED DESCRIPTION OF THE INVENTION

Exemplary embodiments disclosed herein generally provide a cylindrical structure which may be utilized as a fan case for a containment system.

Figure 1:
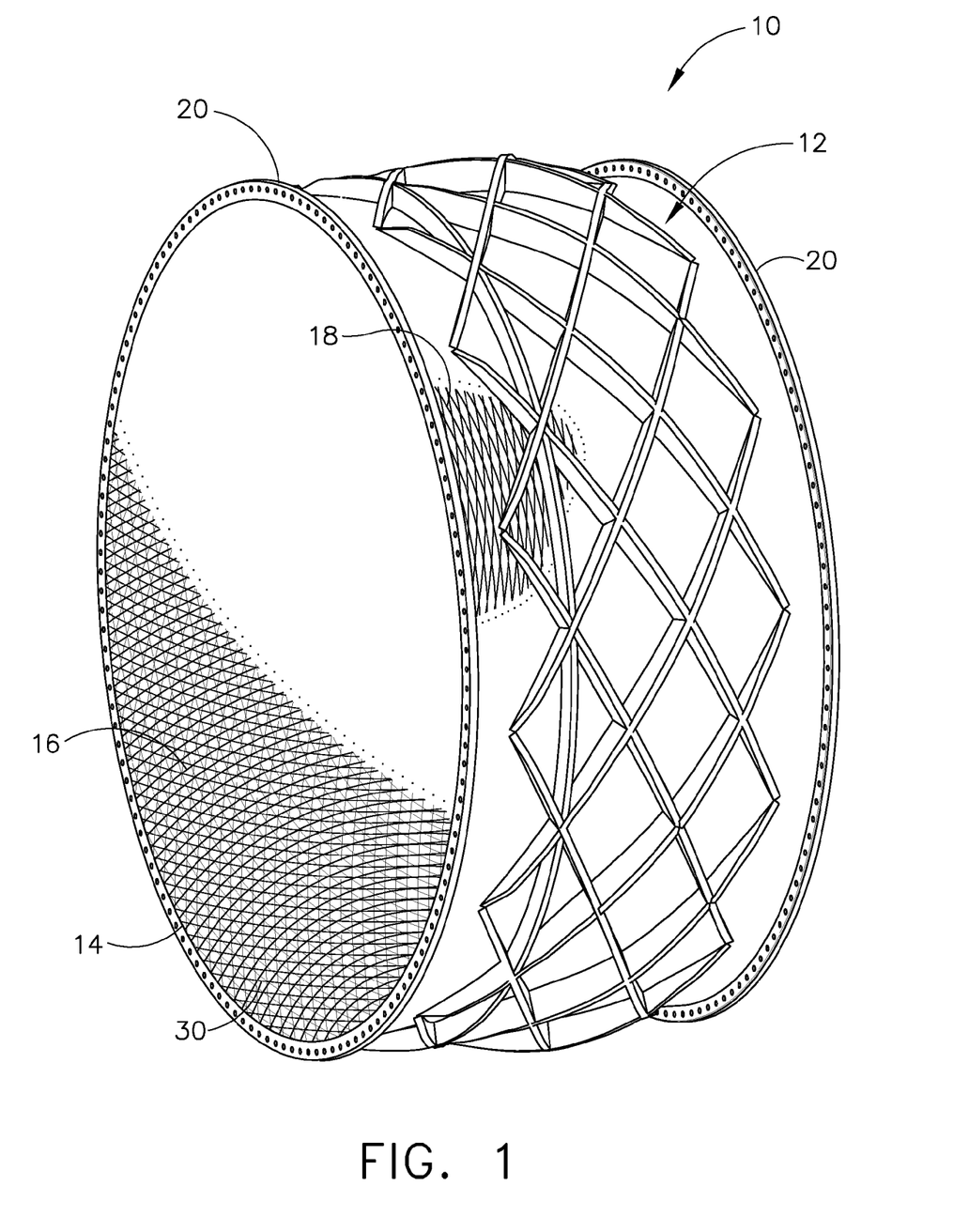
FIG. 1 is a perspective view of a fan case support shell in accordance with an exemplary embodiment of the invention.

Referring to the drawings wherein identical reference numerals denote the same elements throughout the various views, FIG. 1 shows a composite structure such as a fan case support shell 10. The fan case support shell 10 may be utilized to at least partially encircle fan blades (not shown) that are rotatably operable as part of a turbofan engine. The fan case support shell 10 may be utilized to support an outer containment band, not shown but understood by those with skill in the art, as part of a softwall fan containment system.

Figure 2:
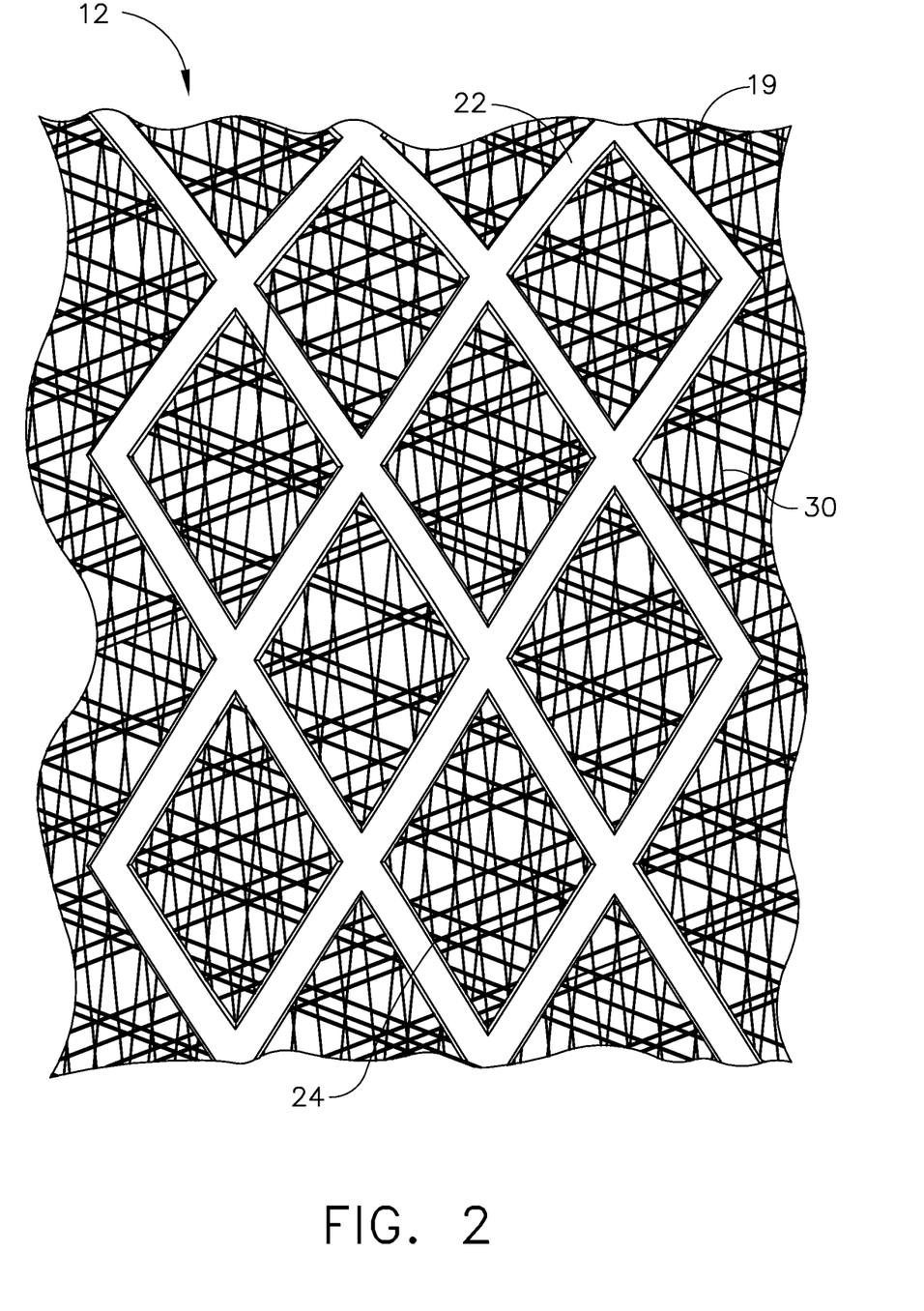
FIG. 2 is a partial view of a fan case support shell during the fabrication process.

An exemplary composite article, e.g., fan case support shell 10 includes a substantially cylindrical body of revolution 12 including casing 14 comprised of a plurality of casing sublayers 16, 18, 19 (See FIG. 2). The casing sublayers include reinforcing material disposed in a resin matrix. Those with skill in the art will appreciate that the term "resin matrix" may be used to identify an uncured, but curable resin or resin system, or it may be used to indicate the cured resin, depending on the context. Likewise, a "composite structure" or "composite article" disclosed herein may refer to the fiber-reinforced structure or article prior to resin cure, or to a final structure or article after resin cure.

As best seen in FIG. 2, an internal grid 22 is disposed within the body 12 and defines a plurality of grid spaces 24. The body 12 includes at least one intermediate casing sublayer 19 radially disposed between an innermost casing sublayer 16 and an outermost casing sublayer 18 (FIG. 1). In an exemplary embodiment, the intermediate casing sublayer 19 extends in the plurality of grid spaces 24. In an exemplary embodiment, the body 12 includes a plurality of intermediate sublayers 19.

Figure 3:
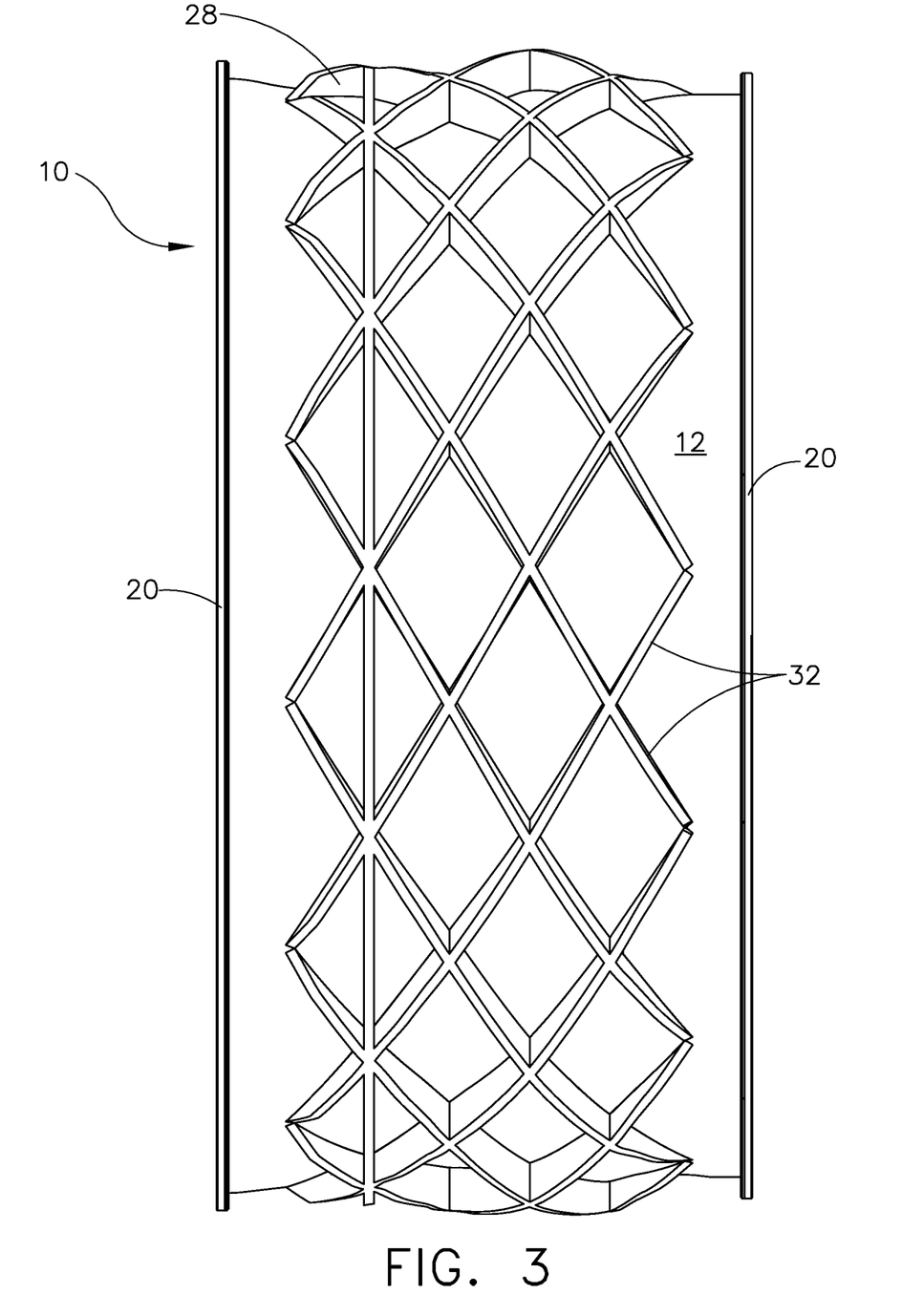
FIG. 3 is a front view of a fan case support shell according an embodiment of the invention.
Figure 4:
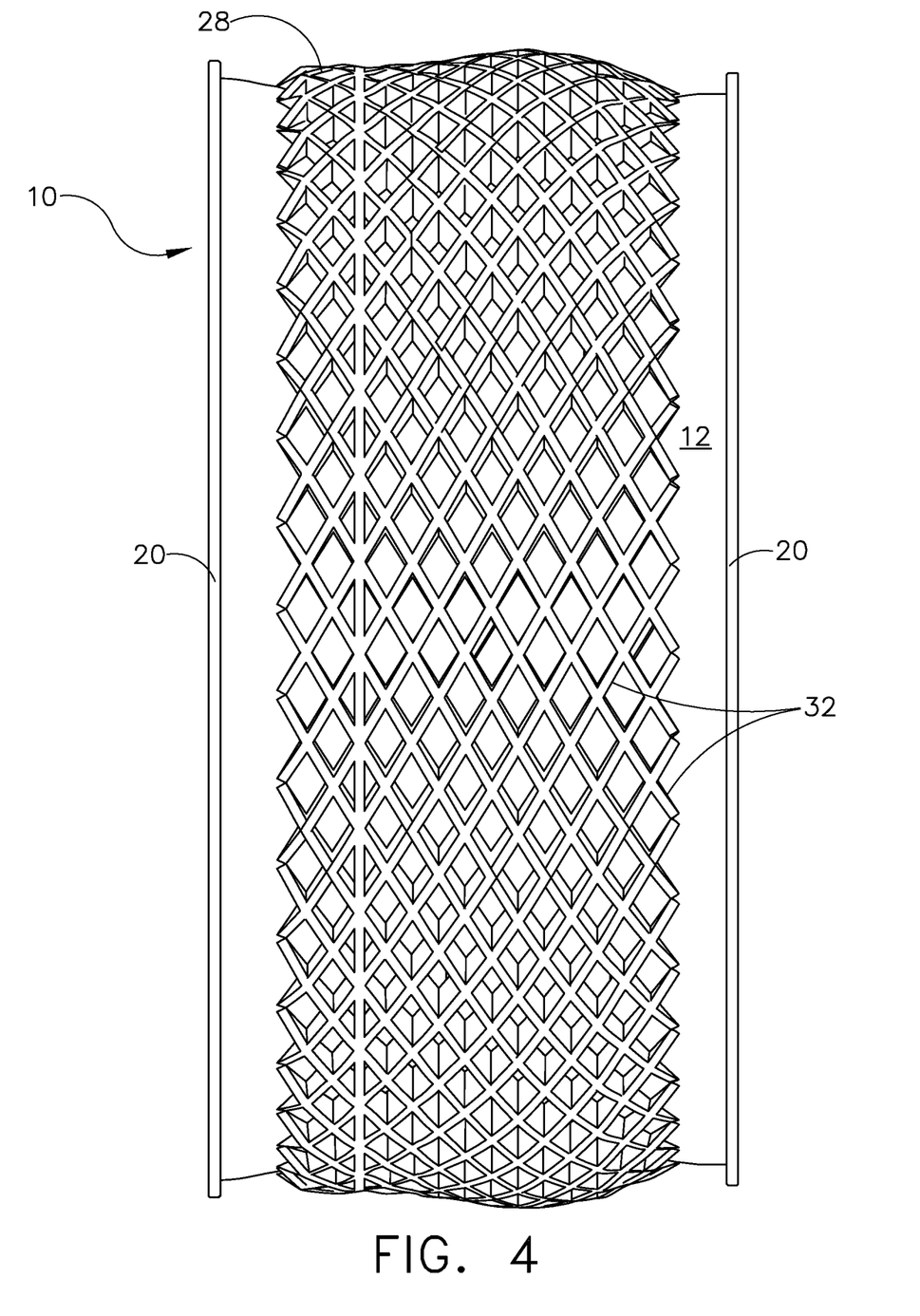
FIG. 4 is a front view of a fan case support shell illustrating an alternative embodiment of the invention.

With particular reference to FIG. 3, in an exemplary embodiment, the composite article or fan case support shell 10 also includes an optional external grid 28 disposed about the body 12 and integral therewith. In an exemplary embodiment, the fan case support shell further optionally includes at least one, and more likely, a pair of flanges 20 disposed about the first and second ends of the body 12 and integral therewith. In an exemplary embodiment, the flanges 20 may be concurrently fabricated features. As those with skill in the art will appreciate, flanges 20 may be utilized to interface the fan case support shell 10 with structural engine components. Alternately, the flanges 20 may be fabricated in another process and integrated with the fan case support shell 10 after the body 12 is fabricated. Those having skill in the art will further appreciate that support shell 10 may include one or more additional "flanges" or protrusions disposed about the body and integral therewith at one or more axial positions between the ends of the body. FIG. 4 illustrates and alternate embodiment having an external grid 28 that exhibits a different pattern than the external grid 28 shown in FIG. 3.

With reference to FIGS. 1 and 2, in an exemplary embodiment, casing 14 comprises a fiber reinforced composite structure. Casing 14, or more specifically each casing sublayer, may be fabricated from reinforcing fiber that is wound on a mandrel, referred to herein as "fiber windings" 30. Those having skill in the art will appreciate that the term fiber windings may encompass fiber tows or tapes that may also be laid down in an automated process. The reinforcing fiber may be disposed in a resin matrix. Alternately, the fiber windings may provide a "dry" preform suitable for a resin transfer or resin infusion process. Alternately, casing 14 may be fabricated from prepreg body plies having reinforcing fibers disposed in a suitable curable resin system. Typical matrix material may include epoxy and polyimide resins. In an exemplary embodiment, casing 14 is provided as successive sublayers of windings and/or prepreg plies.

Internal grid 22 may also include successive sublayers of fiber windings 30. In other words, the internal grid structure may be built up in discrete layers with each layer followed by providing casing sublayers extending through the grid spaces. As explained in greater detail below, internal grid 22 may be provided in a continuous winding process with casing 14. Alternately, internal grid 22 may be provided as tape or filament windings while casing 14 comprises prepreg plies.

During a fan blade out or other event, the exemplary fan case support shell 10 is operable to allow impact objects such as blades or blade fragments to pass through the casing 14 to the containment belt. In exemplary embodiments, a significant portion of the casing 14 remains intact following a blade out event.

In an exemplary embodiment, the internal grid 22 is operable as a damage-limiting substructure. In an exemplary embodiment, the internal grid 22 may comprise a series of sub-layers interleaved between casing sub-layers. Internal grid 22, or more particularly, each sub-layer comprising the internal grid 22, is arranged in a predetermined pattern. As illustrated in FIG. 2, in an exemplary embodiment, the internal grid 22 exhibits a predetermined internal grid pattern. In an exemplary embodiment, the predetermined pattern resembles a grid of interconnecting diamond- or parallelogram-like features projected onto a cylinder. The pattern of the internal grid 22, however, is not so limited, and may be provided in any array as necessary to provide the desired benefits and results.

The predetermined pattern of internal grid 22 defines a plurality of grid spaces 24. In an exemplary embodiment, at least one intermediate casing sub-layer 19 extends into the grid spaces. Casing body 12 is arranged so that the internal grid 22 bounds a plurality of thinner casing areas that fill the grid spaces. Body 12 is stiffer at the internal grid so that objects may pass through the casing at an impact zone 26, see FIG. 5, but generally the overall structure of casing body is maintained. The exemplary embodiment illustrated in FIG. 5 shows external grid 28 which exhibits the same pattern as internal grid 22 (not visible in this view).

In exemplary embodiments, the interior grid 22 may be designed and fabricated with embedded fiber tow or tape between the main body plies of the casing 14. In an exemplary embodiment, the body plies may be prepreg sheets. One, or preferably a plurality of prepreg sheets may be used to form each casing sublayer. In other exemplary embodiments, the casing sublayers are formed by continuous fiber windings. In an exemplary embodiment, the interior grid 22 may be designed and fabricated with wide and/or thicker fiber tow or tape (as compared to the fiber windings for the casing sublayers, or the fiber carried in prepreg sheets) and integrated within main body plies of the casing. In an exemplary embodiment, the wider and/or thicker fiber tows or tape may be wound onto the mandrel in a continuous process with the formation of the casing sublayers.

In an exemplary embodiment, flange 20 may also be formed during fabrication of the casing body. The materials used to provide flange 20 may be laid onto the mandrel and co-cured with the casing body.

Figure 5:
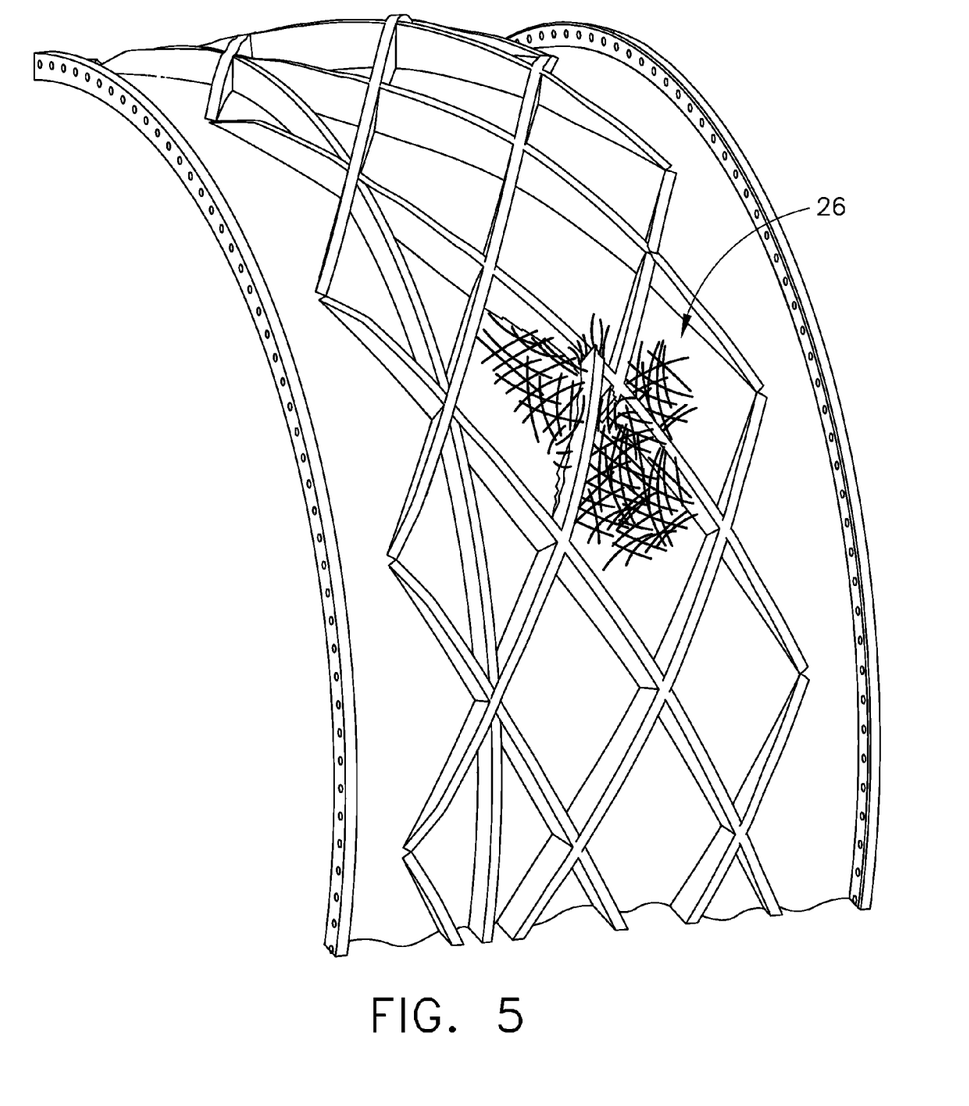
FIG. 5 is a partial view of a fan case support shell following an impact event.

With reference to FIG. 5, during a blade out or other event, the internal grid 22 minimizes damage to the casing 14 by confining the break in the casing to a localized region, generally the impact zone 24 between the internal grid features. The internal grid 22 (not shown but understood to lie radially beneath the external grid 28 and disposed with a similar pattern) enables dissipation of energy away from the impact zone 24. In an exemplary embodiment, substantially all of the damage to the casing caused by an impacting object is retained within an area enclosed by the internal grid. In an exemplary embodiment, the internal grid resists crack propagation throughout the casing following a blade out event.

Exemplary fan case support shells 10, shown in FIGS. 3 and 4, may further include an external grid 28 extending radially outwardly of the body 12. The external grid features or intersecting ribs 28 generally extend radially from body 12. The exemplary external grid 28 may comprise a predetermined external grid pattern similar to the pattern of the internal grid 22. However, the pattern of the external grid 28 is not so limited, and may be different than the internal grid pattern and may comprise any array able to provide the desired benefits and results. For example, FIGS. 3 and 4 depict embodiments of differing patterns for the external grid 28. In an exemplary embodiment, external grid 28 may be arranged and configured so as to be an external continuation of the internal grid 22, as illustrated in FIG. 3. In an exemplary embodiment, the intersecting ribs 32 that form external grid 28 extend radially from body 12 for a thickness sufficient to provide the desired structural support foundation for the containment belt. In one exemplary embodiment, the ribs 32 may extend any thickness up to about two inches (about 5 cm) from the body 12.

In an exemplary embodiment, external grid 28 is provided in such a way as to be integrated with the casing 14. For example, external grid 28 may be fabricated and co-cured with casing 14. The external grid 28 may exhibit various patterns and dimensions to suit specific design requirements such as weight targets, structural stiffness, released blade containment, and the like.

An exemplary embodiment includes a method of forming a composite article such as a fan case support shell 10. The exemplary method includes disposing successive fiber windings onto a substantially cylindrical mandrel. In an exemplary embodiment, the fiber windings comprise reinforcing fiber carried in a curable resin matrix. Some of the fiber windings are laid on to provide the casing body sublayers, and thus the windings follow a predetermined casing layer pattern. It is envisioned that the casing fiber and resin may be wound onto a mandrel in a winding pattern such that a preselected portion of the mandrel is substantially covered in order to provide a first casing sublayer. For example, the winding pattern may place casing fiber and resin so as to substantially cover a portion of the mandrel to thereby mimic a pre-preg casing layer, as illustrated in FIG. 1. The casing sublayer disposed closest to the mandrel represents the innermost sublayer 16. The casing body is built up through one or more intermediate casing sublayers until an outermost casing sublayer 18 is laid on.

In addition to the fiber windings used to form the subcasing layers, some of the fiber windings are laid on to provide the internal grid. The fiber windings for the internal grid follow a predetermined internal grid pattern defining a plurality of grid spaces (FIG. 2).

The fiber windings follow the preselected patterns in successive fashion such that casing sublayers are interleaved between internal grid layers. In an exemplary embodiment, at least one intermediate casing sublayer 19 is laid on the mandrel to extend in and substantially fill the plurality of grid spaces. It is envisioned that the casing body includes a plurality of "intermediate" casing sublayers disposed between the innermost casing sublayer and the outermost casing sublayer.

In an exemplary embodiment, the method further includes disposing successive fiber windings radially outwardly of the outermost casing sublayer in a predetermined external grid pattern. In an exemplary embodiment, external grid 28 may be envisioned as an outward continuation of internal grid 22 in that after the final casing sublayer is provided, material similar to the internal grid material may be applied by winding or hand lay-up and the like for a predetermined number of passes or predetermined thickness in a similar pattern as internal grid 22.

In other exemplary embodiments, the external grid 28 may be provided in a different pattern. Additionally, external grid 28 may comprise different materials in terms of fibers, fiber thickness or width, resin matrix, etc., than the material utilized for internal grid 22.

In an exemplary embodiment, internal grid 22 is formed from fiber tows that may be about 0.25 inches wide by about 7.5 mils thick. Each successive layer of the internal grid 22 may be laid in multiple passes to a predetermined radial height. In an exemplary embodiment, the material utilized to provide the internal grid 22 is substantially the same material as the casing material.

In an exemplary embodiment, a first winding pattern may be used to lay down the innermost casing sublayer 16. The winding pattern may be changed to a second winding pattern, without changing material, such that a portion of the internal grid 22 is laid down in a preselected pattern onto the innermost casing sublayer. In the second winding pattern, less than the entirely of the first casing layer is covered forming at least a partial internal grid pattern. After a predetermined number of passes in laying down the first portion of the internal grid, the winding pattern may be restored to the initial winding pattern to form an intermediate casing sublayer or sublayers 19. The process may be repeated as necessary until sufficient casing layers and internal grid thickness are achieved. As set forth above, the casing sublayers 16, 18, 19 may be provided by an automated tow placement machine or tape-laying machine.

The internal grid 22 may be fabricated using many different processes, utilizing many different fibers, fiber performs, and resins. For example, the internal grid 22 may be provided in a hand layup process with prepreg tape or fabric. Additionally, internal grid 22 may include a textile preform impregnated through a resin infusion process. Further, the internal grid 22 may be provided by an automated tow placement machine or tape-laying machine.

An exemplary embodiment includes a continuous casing (i.e., no separate internal grid) and an external grid. The external grid may function as a crack propagation limiter as well as support for the containment belt. The eternal grid may be provided in a pattern of radially extending ribs arranged so as to provide the desired stiffness and crack limiting characteristics. The casing may be provided as layered prepreg laminates or as windings as described herein.

In an exemplary embodiment, an internal grid may be fabricated using fiber tow or tape integrated with main body plies. Other exemplary internal grids may be fabricated with wider and/or thicker fiber tow or tape and integrated within the body ply fiber architecture.

In an exemplary embodiment, the internal and/or external grid structure can be designed and fabricated with intentional weak points such as at the grid cross-over to provide more controlled breakage and dissipation of energy in order to minimize the risk of more extensive or catastrophic failure.

In an exemplary embodiment, the uncured composite structure is cured under suitable cure conditions in an autoclave. In an exemplary embodiment, the external grid structure can be cured together with casing body with one single autoclave cure cycle. In other exemplary embodiments, the external grid structure may be provided in a distinct operation, rather than a continuation of the body fabrication process.

In an exemplary embodiment, an integrated external grid provides stiffness in normal operating condition substantially equivalent to an aluminum honeycomb structure at lower weight and comparable cost. The integrated external grid provides additional strength during a fan blade out event. It is envisioned that a casing structure having a dense integrated external grid may provide complete containment without the need for dry containment fabric. It is further envisioned that the external grid structure will provide weight reduction benefit as compared to traditional hardwall case design.

This written description uses examples to disclose the invention, including the best mode, and also to enable any person skilled in the art to make and use the invention including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composite article, for fan containment in a gas turbine engine comprising:
   a substantially cylindrical body including a plurality of casing sublayers comprising fiber winding reinforcing material disposed in a resin matrix, the body including at least one intermediate casing sublayer radially disposed between an innermost casing sublayer and an outermost casing sublayer; further comprising,
   an internal grid disposed within the body, wherein the internal grid defines a plurality of grid spaces; and
   wherein the at least one intermediate casing sublayer is interleaved with the internal grid and extends in the plurality of grid spaces.

2. The composite article according to claim 1 further comprising an external grid disposed about the body and integral therewith.

3. The composite article according to claim 1 further comprising a pair of flanges integral with the body and disposed about first and second ends thereof.

4. The composite article according to claim 1 wherein the reinforcing material includes continuous reinforcing fibers.

5. The composite article according to claim 1 wherein the reinforcing material includes fiber reinforced prepreg sheets.

6. The composite article according to claim 2 wherein the external grid comprises further reinforcing material disposed in a resin matrix and arranged in a predetermined external grid pattern.

7. The composite article according to claim 6 wherein the further reinforcing material includes at least one member selected from the group consisting of continuous fiber tows and tapes.

8. The composite article according to claim 2 wherein the external grid extends radially outward from the body to provide structural support for an associated containment belt.

9. The composite article according to claim 1 wherein the resin matrix comprises a cured resin.

10. The composite article according to claim 1 wherein the resin matrix comprises a curable resin.

11. The composite article according to claim 1 further comprising a plurality of intermediate casing sublayers and wherein the internal grid comprises successive fiber windings between at least two of the intermediate casing sublayers.

12. A composite article, for improved fan containment in a gas turbine engine, comprising reinforcing fiber windings wherein a first portion of the fiber windings are laid out in a predetermined internal grid pattern to form an internal grid structure defining a plurality of grid spaces and a second portion of the fiber windings are laid out in a predetermined body sublayer pattern at differing radial locations of said grid structure to form a plurality of sublayers of a body, wherein the sublayers of the body extend circumferentially in the grid spaces.

13. The composite article according to claim 12 wherein the fiber windings comprise continuous reinforcing fibers disposed in a resin matrix.

14. The composite article according to claim 13 wherein the resin matrix is at least one member selected from a cured resin matrix and a curable resin matrix.

15. The composite article according to claim 12 further comprising an external grid structure comprising a plurality of additional fiber windings laid out in a predetermined external grid pattern.

16. The composite structure according to claim 15 wherein the predetermined external grid pattern is substantially similar to the predetermined internal grid pattern.

* * * * *